United States Patent [19]
Delgado et al.

[11] Patent Number: 5,892,673
[45] Date of Patent: *Apr. 6, 1999

[54] ROBUST, HIGH-DENSITY, HIGH-EFFICIENCY STATE SEQUENCE CONTROLLER FOR AN AUXILIARY RESONANT COMMUTATION POLE POWER CONVERTER

[75] Inventors: Eladio Clemente Delgado, Burnt Hills; Mustansir Hussainy Kheraluwala, Schenectady, both of N.Y.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 622,504

[22] Filed: Mar. 25, 1996

[51] Int. Cl.[6] .......................... H02M 7/517; H02M 7/521
[52] U.S. Cl. .............................................. 363/98; 363/138
[58] Field of Search ................................ 363/97, 98, 17, 363/16, 132, 96, 138

[56] References Cited

U.S. PATENT DOCUMENTS

| | | |
|---|---|---|
| 4,730,246 | 3/1988 | Schwesig ................................ 363/132 |
| 5,047,913 | 9/1991 | DeDoncker et al. . |
| 5,172,309 | 12/1992 | De Doncker et al. ................... 363/132 |
| 5,568,368 | 10/1996 | Steigerwald et al. ..................... 363/17 |
| 5,594,634 | 1/1997 | Rajashekara et al. ..................... 363/98 |
| 5,612,860 | 3/1997 | Meszlenyi ................................. 363/17 |

OTHER PUBLICATIONS

"The Auxiliary Resonant Commutated Pole Converter", R.W. DeDoncker, JP Lions, IEEE–IAS 1990 Converence Proceedings.

*Primary Examiner*—Peter S. Wong
*Assistant Examiner*—Derek J. Jardieu
*Attorney, Agent, or Firm*—Jill M. Breedlove; Douglas E. Stoner

[57] ABSTRACT

A high-density control circuit for an auxiliary resonant commutation pole (ARCP) circuit is internal to the ARCP package and includes a state machine sequencer for providing control and timing signals to achieve high-efficiency, zero-voltage, and fault-tolerant switching converter operation. The phase leg controller receives as inputs a phase enable signal and a pulse width modulation (PWM) signal from a system controller and gate drive feedback signals from main and auxiliary gate drivers. There are four paths the state machine sequencer can take when making a transition from one dc rail to the other, depending on whether the main diode or main switch is conducting and the magnitude and polarity of the inverter pole output current.

9 Claims, 8 Drawing Sheets

5,892,673

ROBUST, HIGH-DENSITY, HIGH-EFFICIENCY STATE SEQUENCE CONTROLLER FOR AN AUXILIARY RESONANT COMMUTATION POLE POWER CONVERTER

The United States Government has certain rights in this invention pursuant to Air Force Contract No. F33615-93C-2366.

FIELD OF THE INVENTION

The present invention relates generally to power converters and, more particularly, to a robust, high-density, high-efficiency controller for an auxiliary resonant commutation pole (ARCP) which is used to achieve soft-switching of the switching devices of a power converter.

BACKGROUND OF THE INVENTION

De Doncker et al. U.S. Pat. No. 5,047,913, which is assigned to the present assignee and is incorporated by reference herein, describes auxiliary circuitry known as the auxiliary resonant commutation pole, or phase leg, (ARCP) circuit for achieving soft-switching of the switching devices of a power converter. The ARCP circuit comprises auxiliary switching devices connected in series with an inductor and snubber capacitors. U.S. Pat. No. 5,047,913 describes a control method whereby the gating and conduction times of the converter's switching devices, in addition to those of the auxiliary devices, are controlled to ensure that the output voltage attempts to overshoot the positive and negative converter rail voltages during each resonant commutation cycle in order to achieve soft-switching of all the converter's switching devices.

Disadvantageously, ARCP control circuits are typically complex and hardware intensive. In addition, the control state sequencing in these circuits is external to the ARCP package, resulting in less-than-robust and bulky designs. Accordingly, it is desirable to provide a robust, high-efficiency, high-density control for the ARCP which involves a simple control method. Furthermore, it is desirable that such a control require less signal processing circuitry and exhibit fault tolerance.

SUMMARY OF THE INVENTION

An ARCP circuit comprises auxiliary switching devices and associated antiparallel diodes coupled between the junction joining the main switching devices of an inverter pole and the junction between a pair of input filter capacitors. A phase leg controller for the ARCP circuit in accordance with the present invention is internal to the ARCP package and comprises a state machine sequencer for providing control and timing signals to achieve high-efficiency, zero-voltage and fault-tolerant switching operation. The phase leg controller receives as inputs a phase enable signal (for enabling or disabling a respective inverter pole) and a pulse width modulation (PWM) signal from a system controller and gate drive feedback signals from main and auxiliary gate drivers. There are four paths the state machine sequencer can take when making a transition from one dc rail to the other, depending on whether the main diode or main switch is conducting and the magnitude and polarity of the inverter pole output current. By these state machine transition paths, high-efficiency, zero-voltage, and fault-tolerant switching converter operation is achieved in a high-density, internal control.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
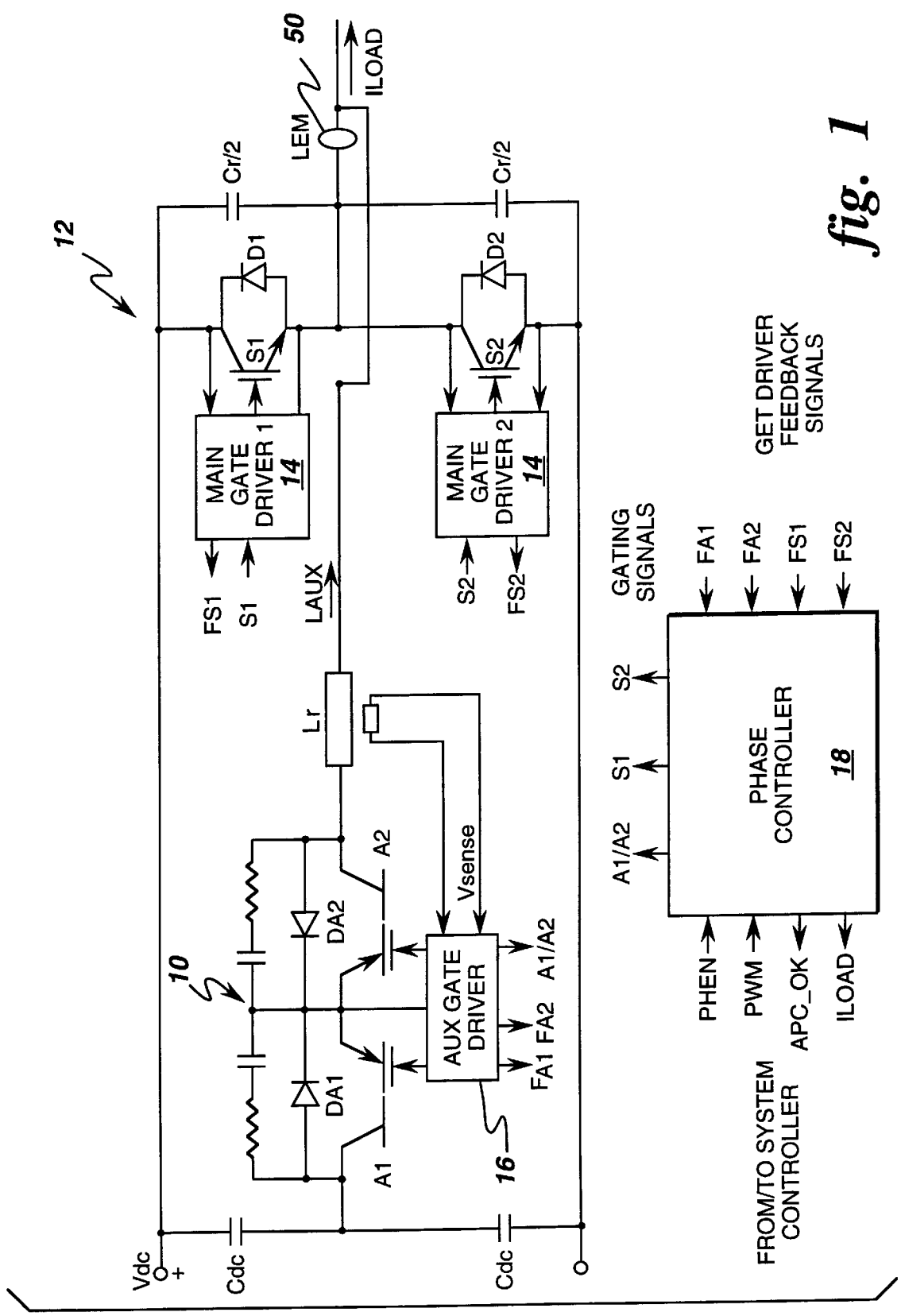
FIG. 1 is a functional block diagram of an ARCP system in accordance with the present invention.

FIG. 1 illustrates an ARCP circuit 10 for an inverter pole, or phase leg, 12. The inverter phase leg 12 is illustrated as comprising two main switching devices S1 and S2, which by way of example are shown as comprising insulated gate bipolar transistors (IGBT's), connected in series across the positive and negative rails of a dc supply Vdc. Each main switching device has an antiparallel diode D1 and D2, respectively, and a snubber capacitor Cr/2 connected thereacross. The ARCP circuit 10 is coupled between the junction joining main switching devices S1 and S2 and the junction joining a pair of substantially equivalent "bus-splitting" filter capacitors Cdc which are connected in series across the dc supply Vdc. The ARCP circuit 10 comprises two auxiliary switching devices A1 and A2 which have their emitters connected together and are shown, by way of example, as comprising MOS-controlled thyristors. Each auxiliary switching device A1 and A2, respectively, has an antiparallel diode DA1 and DA2, respectively, connected thereacross; the anodes of the auxiliary antiparallel diodes are connected together. The control electronics are depicted as comprising three basic functional blocks: main gate driver circuits 14 for the half-bridge pole devices S1 and S2; an auxiliary gate driver circuit 16 for the auxiliary commutation devices A1 and A2; and a phase leg controller circuit 18.

Figure 2:
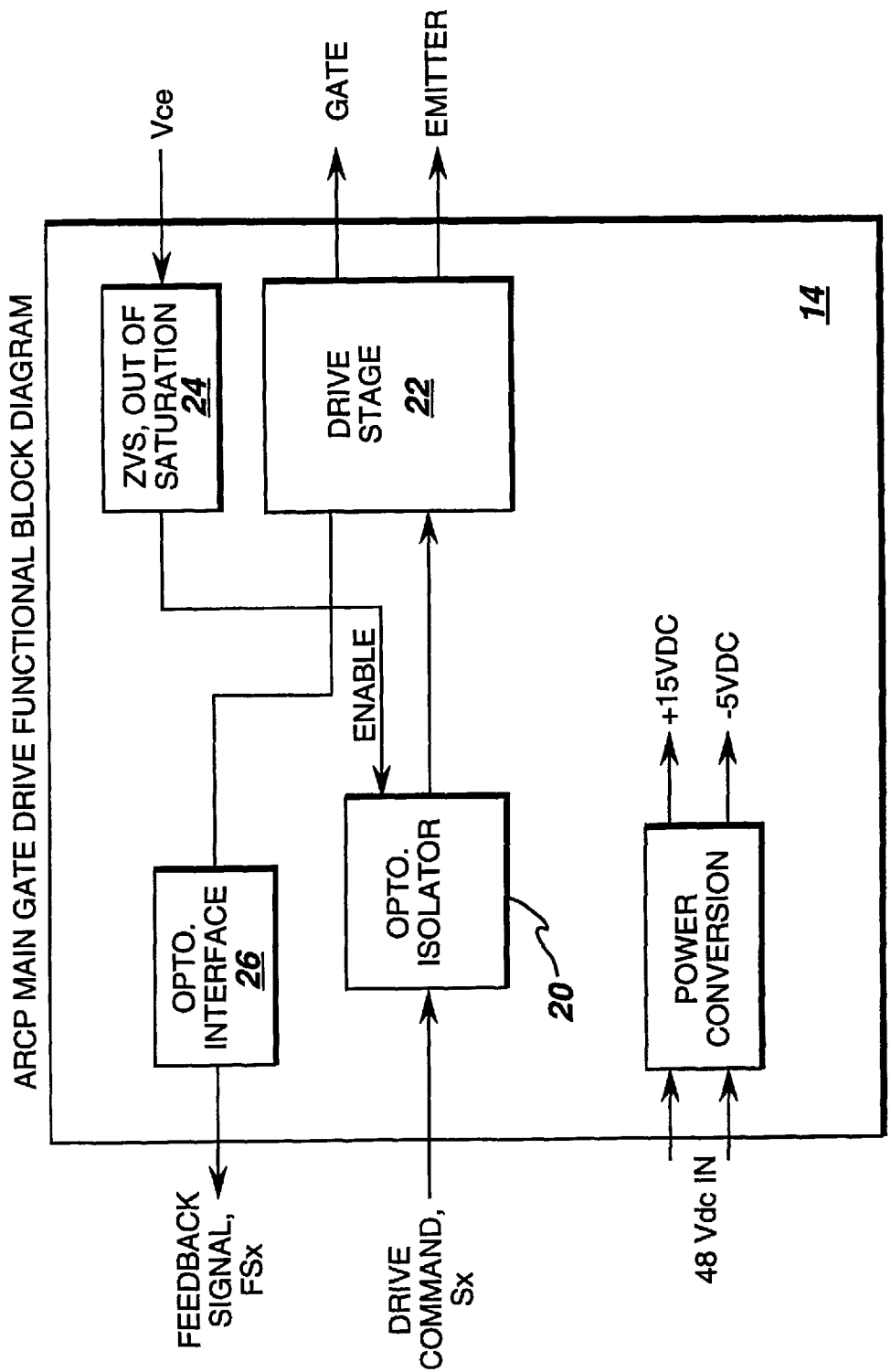
FIG. 2 is a functional block diagram of a main gate drive for the ARCP of FIG. 1 in accordance with the present invention.

FIG. 2 shows a functional block diagram of the main switch gate driver circuits 14. A drive command Sx (i.e., S1 or S2) from the phase leg controller 18 is optically isolated in an opto-isolator 20 and then drives a high current drive stage 22 to switch the gate of the corresponding main device. The opto-isolator 20 is enabled only when the collector-to-emitter voltage Vce of the main device is below a preset threshold, typically in the range of 10V–15V, which advantageously ensures that the device is gated on only when the voltage across it is near zero volts. This function has been implemented with a simple analog circuit 24 which senses the collector-to-emitter voltage Vce. A status signal FSx (i.e., FS1 or FS2), which is developed within the gate driver circuit 14, is fed back through an opto-interface circuit 26 to the phase leg controller 18 to indicate the output state (on or off) of the gate driver 14.

Localized zero-voltage switching is accomplished by the gate driver 14 while information about the status of the main switch is transmitted back to the phase leg controller 18 where decisions are made concerning the proper sequencing and timing of the main and auxiliary power devices of the ARCP pole. Moreover, since the gate driver 14 can only turn on when the voltage across the main device it drives is near zero volts, it inherently prevents a pole shoot-through that could be triggered by noise on the drive command. Also, this near-zero voltage sensing control provides a localized quick turn-off mechanism during an overcurrent condition as the main IGBT switch comes out of saturation, causing the collector-to-emitter voltage Vce to rise above the gate switching threshold (10V–15V).

Figure 3:
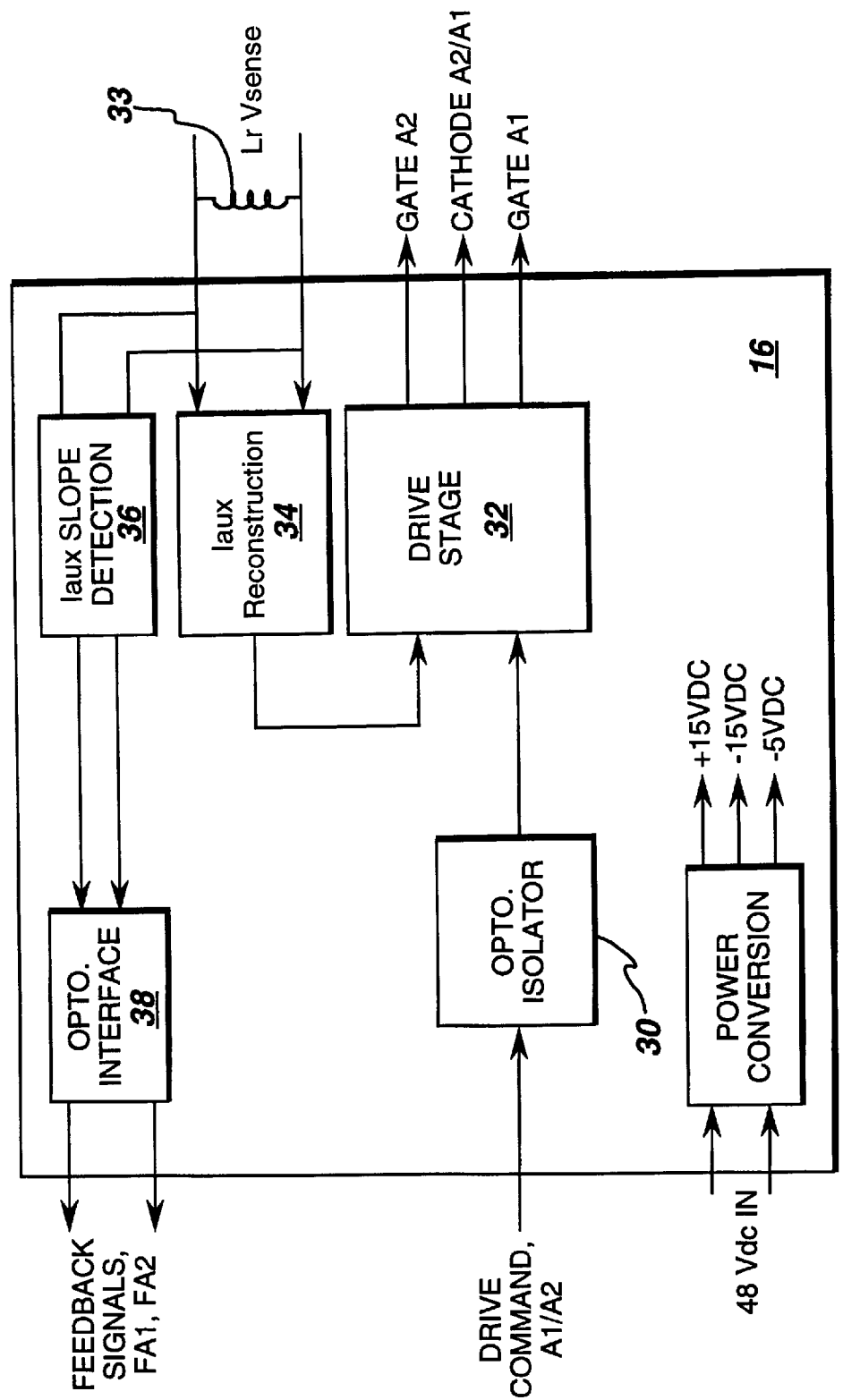
FIG. 3 is a functional block diagram of an auxiliary gate drive for the ARCP of FIG. 1 in accordance with the present invention.

FIG. 3 shows a functional block diagram of the gate driver circuit 16 for the auxiliary switching devices A1 and A2. A single drive command (A1/A2) from the phase leg controller 18 is optically isolated in an opto-isolator 30. The resulting signal drives a high-current drive stage 32 for each of the auxiliary devices A1 and A2. When commanded, the drive stage 32 turns on both auxiliary switches A1 and A2. Internal circuits in the drive stage 32 determine which of the two devices has current flowing therein and latch that device on via a Latch signal, while the other auxiliary switching device turns off when the drive command is removed.

Once the appropriate auxiliary switching device is latched on, the drive command can be removed. The current seen by the auxiliary devices is a resonant pulse; hence, the gate-assisted latched device is allowed to naturally commutate off when the resonant pulse returns to zero. In a preferred implementation, the internal latching circuit on the gate driver turns the device off as soon as the current falls below a preset threshold, which is just prior to the resonant current reaching zero.

A voltage sensing coil 33, preferably on the resonant inductor Lr of the ARCP circuit, and an analog integrator (not shown—incorporated in an auxiliary current Iaux reconstruction circuit 34) are used to reconstruct the current Iaux in the auxiliary commutation circuit. An analog switch (not shown) also in the current reconstruction circuit 34, which is controlled by the drive stage output, provides the set/reset of the analog integrator. A threshold level detection of the reconstructed auxiliary current Iaux provides the gate latching signal described hereinabove. This current threshold level is preset to a value small enough to ensure that the conducting auxiliary device has attained a fully on-state when the input drive command A1/A2 is high.

The presence of the auxiliary current Iaux, as reconstructed by reconstruction circuit 34, and the slope of the auxiliary current Iaux, as detected by a slope detection circuit 36, are relayed via an optical interface 38 to the phase leg controller 18 through two feedback signals FA1 and FA2. The slope of the auxiliary current is easily ascertained in the slope detection circuit in a well-known manner from the polarity of the voltage across the resonant inductor Lr. This information is required by the phase leg controller 18 to coordinate the various state transitions. Advantageously, use of the voltage sensing coil 33 on the resonant inductor Lr to extract all the information regarding the auxiliary current Iaux is very simple and cost-effective.

Figure 4:
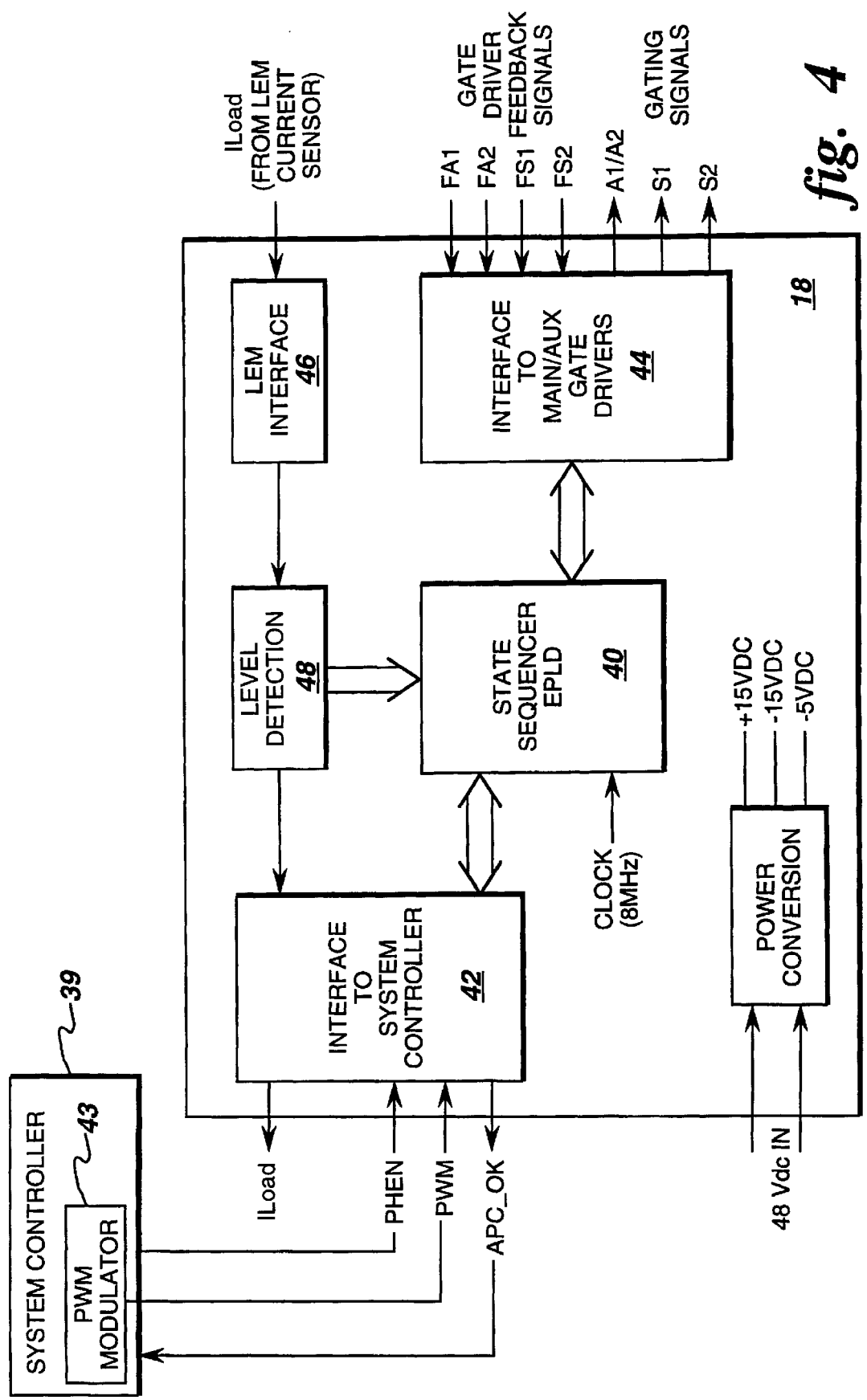
FIG. 4 is a functional block diagram of the phase controller for the ARCP of FIG. 1 in accordance with the present invention.

FIG. 4 illustrates the functional block diagram for the ARCP phase controller 18 according to the present invention. It provides the interface between a system controller 39, where the application-specific algorithm resides, and the gate driver circuits 14 and 16. The core of the control and timing for the ARCP phase leg comprises a state machine sequencer 40. The state machine sequencer is preferably implemented in an erasable programming logic device (EPLD). The system controller 39 sends two logic signals to the phase leg controller via an interface 42: a phase enable signal PHEN which tells the phase leg controller to enable or disable a respective phase leg; and a PWM signal which tells the phase leg controller which of the two main switches should be turned on. The PWM signal is generated in a well-known manner by a modulator 43 in the system controller. Feedback signals FA1, FA2, FS1 and FS2 from the gate driver circuits 14 and 16 are inputs to the phase controller 18 via an interface 44. In addition, a composite current signal made up of the load current ILoad and the auxiliary current Iaux is provided to the controller via an interface 46 and a level detection circuit 48 from a current sensor 50 (FIG. 1), which is illustrated as comprising an LEM current sensor manufactured by LEM, U.S.A., Inc. The state machine sequencer processes these signals in order to coordinate the proper control and timing for soft-switching operation of the power devices and also to handle various fault modes.

Timing signals, which are critical to the proper operation of the ARCP, are generated internal to the EPLD and are additional inputs to the state machine 40. The outputs of the state machine are the gate drive commands S1, S2, and A1/A2 and a status signal APC_OK to the system controller. The main gate drive commands are generated from the PWM command from the system controller with the proper dwell time determined by the phase leg controller. The state sequencing machine clock frequency is illustrated as being 8 MHz, as derived from a local crystal oscillator. All signals to and from the phase leg controller 18 are optically isolated. In some applications, the input and output signals are transmitted via optocouplers, while in other applications which require higher levels of common mode rejection, fiber optical links are used. The phase leg output current signal ILoad is also amplified on the phase controller card before it is fed back to the system controller for closed-loop control.

Figure 5:
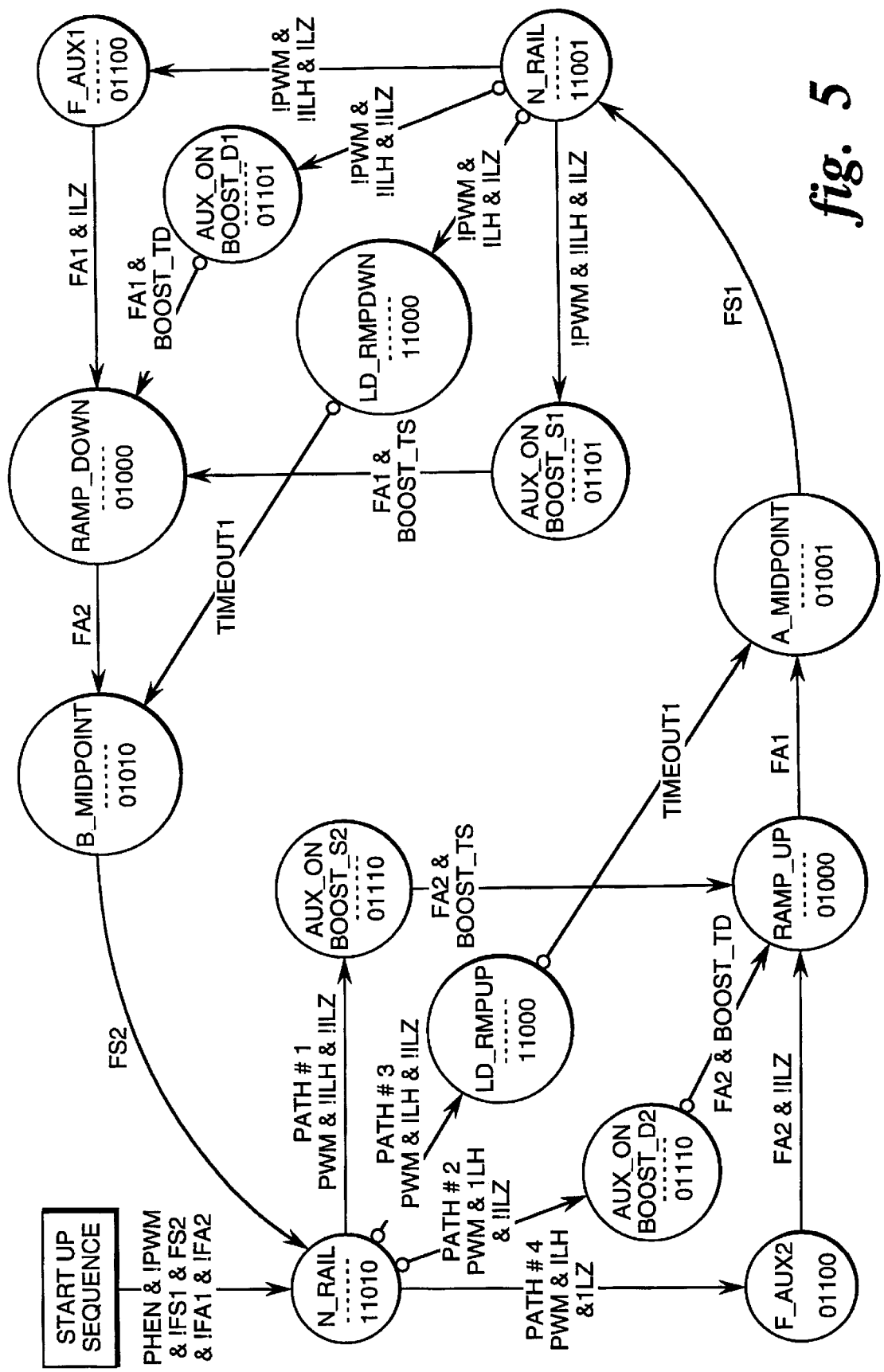
FIG. 5 is a state diagram for the core state sequencer of the phase controller of FIG. 4.

The tables below list the various relevant inputs, outputs, and timing signals for the state machine, and FIG. 5 is a state diagram showing the core ARCP phase leg control.

The signals listed in Table 1 are critical to the sequencing of the core ARCP state machine as illustrated in the state diagram of FIG. 5.

TABLE 1

Primary I/O Signals

| I/O TYPE | NAME | DESCRIPTION |
|---|---|---|
| input | PHEN | Phase Enable/Disable from system controller |
| input | PWM | Turn on S1, S2 from system controller |
| input | FS1 | S1 gate drive feedback from S1 gate drive |
| input | FS2 | S2 gate drive feedback from S2 gate drive |
| input | FA1 | Iaux negative slope feedback from aux gate drive |
| input | FA2 | Iaux positive slope feedback from aux gate drive |
| input | ILZ | ILoad polarity derived on phase leg controller from LEM current sensor. ILZ is logic high when ILoad > 0 and vice versa. |
| input | ILH | ILoad threshold derived on phase leg controller from ILEM. ILH is logic high when \|ILEM\| >predetermined threshold and vice versa. |
| input (timer) | BOOST_TS | Boosting time. See Note 1. |
| input (timer) | BOOST_TD | Diode current displacement time. See Note 2. |
| input (timer) | TIMEOUT1 | Rail transition time. See Note 3. |
| output | S1 | S1 gate drive command |
| output | S2 | S2 gate drive command |
| output | AUX | A1, A2 drive command |
| output | APC_OK | Status feedback to system controller |

The following ancillary signals shown in Table 2 are needed to handle all the fault handling and load current processing shown in the complete state diagram of FIG. 6.

TABLE 2

Ancillary I/O Signals

| I/O TYPE | NAME | DESCRIPTION |
| --- | --- | --- |
| input | ILF | ILoad fault level detect derived on phase leg controller from ILEM. ILF is logic High when \|ILEM\| > predetermined fault level and vice versa. |
| input (timer) | TIMEOUT2 | Watchdog timer. See Note 4. |
| input (timer) | FLT_TIMEOUT | Watchdog timer. See Note 5. |
| output | S/H | Sample/hold command for ILoad. |

Note 1: BOOST_TS is a predetermined time required to boost current in the commutating main switch (S1 or S2) so that at turn off the current in the switch is large enough to swing the pole from one dc rail to the other in order to maintain zero-voltage switching conditions at turn off. This is required only when the pole output current is below a predetermined threshold level. The boosting time is based on the value of the resonant inductor Lr, the minimum dc bus voltage, and the predetermined threshold current.

Note 2: BOOST_TD is a predetermined time required to displace current from a conducting main diode (D1 or D2) and store additional energy in the resonant inductor in order to overcome auxiliary circuit losses for a complete resonant transition of the pole voltage during commutation. This is required only when the pole output current is below a predetermined threshold level. The minimum required time is enough to at least displace the predetermined threshold current from the conducting main diode.

Note 3: TIMEOUT1 is a predetermined time required to swing the pole voltage from one dc rail to the other when the load current is above the threshold and when commutating from a main switch. This time should be large enough to allow a full pole voltage swing under minimum turn-off current, i.e., the threshold level, and for the maximum dc bus voltage.

Note 4: TIMEOUT2 functions as a watch dog timer when the state machine is in certain transitional states to provide a time check for preventing the state machine from remaining in such a transitional state due to a lack of proper input conditions needed to make a transition.

Note 5: FLT_TIMEOUT functions as another watch dog timer when the state machine is in certain transitional states to provide a time check for preventing the state machine from remaining in such a transitional state due to a lack of proper input conditions needed to make a transition.

The following is a description of the ARCP controller state sequencer based on the core state machine 40 as illustrated in the state diagram of FIG. 5.

ARCP Controller State Machine Sequencer

Each circle in the state diagram of FIG. 5 represents a state of the state machine which, in turn, represents a specific condition of the ARCP pole. The name of the specific state and the active outputs bits are shown within each circle. The output bits starting from the most significant bit are: the Sample/Hold command S/H, the APC_OK status signal, the AUX drive command, and the S2 and S1 drive commands.

The state N_RAIL represents the state in which the lower main switch S2 of the ARCP is conducting and the upper main switch S1 is off such that the pole is clamped to the negative dc rail. P_RAIL represents the complementary state. All state transitions from P_RAIL to N_RAIL are a complement of those from N_RAIL to P_RAIL. Hence, only transitions from N_RAIL to P_RAIL are described herein.

There are four different paths that the state machine can take when making the transition from one rail to the other, depending on whether the main diode or main switch is conducting and the magnitude and polarity of the load (pole output) current ILoad. To transition from the negative dc rail N_RAIL, the PWM signal is high, indicating that the system controller is commanding the upper main switch S1 to be turned on. Then, depending on the polarity of the load current and whether the magnitude of the load current is below or above a boosting current threshold, the specific path of transition is selected.

Path #1

Path #1 represents transitions from the negative, or lower, dc rail N_RAIL when the main device S2 is conducting, the load current ILoad is below the boosting current threshold, and the polarity of the load current is negative (i.e., toward the pole).

To command the ARCP to switch to the positive, or upper, dc rail P_RAIL, the PWM signal from the system controller goes high. Due to the low load current level (sensed as the signal ILH being low, indicated as !ILH in the state diagram), and the polarity of the current (sensed as the signal ILZ being low, indicated as !ILZ in the state diagram), the state machine advances to the AUX_ON_BOOST_S2 state wherein the state machine implements a current boost in the lower main device S2. This is accomplished by turning on auxiliary switch A2 while the main switch S2 remains conducting. The amount of boost is set by the time delay BOOST_TS.

A proper sequence is detected by the state machine from the auxiliary gate feedback signal FA2 which becomes high (active). This signal tells the state machine that the auxiliary current is present and has the correct direction for boosting in this condition. As the time delay is reached, with the FA2 signal active, the state machine transitions to the RAMP_UP state. During this state, the ARCP pole voltage is nearly halfway in the transition from the lower rail to the upper rail and is approaching the value of the midpoint voltage. During this state, the main switch S2 is off and the gate drive signals to the auxiliary gates are low, i.e., off. Although the gating signal to the auxiliary gates are low, the auxiliary device which is conducting current remains on until the current in the auxiliary path approaches zero.

As the ARCP pole reaches halfway in its swing between the lower and upper rail voltages, the current in the auxiliary path reaches its peak in the resonant cycle. This current peak is detected by the state machine via FA1 and FA2 feedbacks from the auxiliary gate. As the auxiliary current peaks, the voltage feedback of the sense winding (which is preferably a single-turn) in the resonant inductor becomes zero and the feedback signal FA2 is turned off.

The auxiliary current starts to decrease, changing the polarity of the voltage feedback from the sense winding in the resonant inductor. This causes the auxiliary feedback signal FA1 to become high. A high FA1 signal during the RAMP_UP state indicates to the state machine that the ARCP pole voltage has reached its midpoint. Thus, the sequencing continues to the next state A_MIDPOINT wherein the ARCP pole transitions to above the midpoint.

At this time, the state machine commands the upper device S1 to be turned on, and waits for a feedback signal from the upper gate (S1) drive acknowledging that it has enabled itself on. Enable of the upper gate occurs when its internal circuit senses near-zero voltage across the main device it is controlling (S1), as described hereinabove.

Acknowledgment of the enable is fed back via the FS1 signal. Receipt of an active high FS1 by the state machine completes the switching cycle and the state machine sequences to the upper rail P_RAIL. The pole will remain at the upper dc rail until the PWM command is changed to a low by the system controller.

Path #2

This path involves transitions from the lower dc rail when the diode D2 is conducting, the load current ILoad is below the boosting threshold (i.e., ILH is low), and the polarity of the load current is positive (i.e., toward the load such that ILZ is high). Under these conditions, the state machine sequences to the AUX_ON_BOOST_D2 state from N_RAIL.

The output bits are same as the other low current boost state AUX_ON_BOOST_S2 of Path #1, but a different time delay BOOST_TD is used by the state machine in order to advance to the next state which is the RAMP_UP state. The time delay BOOST_TD in this path is longer than the time delay BOOST_TS in Path #1 because the current in the auxiliary circuit has to reach the threshold level and exceed this amount by a predetermined value. In particular, a longer time delay in this path is necessary to displace the current in the diode D2 and provide additional energy in the resonant inductor to overcome circuit losses and to aid the pole to fully resonate to the opposite dc rail.

Once the RAMP_UP state is reached, the state machine progresses to the P_RAIL state in the same manner as in Path #1.

Path #3

This path involves transitions of the pole from the lower dc rail when the main device S2 is conducting with the load current above the boosting threshold (i.e., ILH high), and the polarity of the current is negative (i.e., ILZ low). The state machine sequences to the load ramp up LD_RMPUP state which does not use the auxiliary circuit to swing the pole. The load current and resonant capacitors across the main device control the pole voltage ramp.

The only qualifier to sequence out of this state is the TIMEOUT1 time delay. Sensing the completion of the TIMEOUT1 delay sequences the state machine directly to the A_MIDPOINT state and progresses to the positive rail in the same manner as in Path #1.

Path #4

This path involves transitions of the ARCP pole from the lower dc rail to the upper dc rail when the main diode D2 is conducting, the load current is above the boosting threshold level (i.e., ILH is high), and the polarity of the load current is positive (i.e., ILZ is high).

The switching event is initiated by the system controller via the PWM command being set high, and the state machine sequences to the F_AUX2 state wherein the auxiliary gate is commanded on, but the main switch S2 is not since the anti-parallel diode D2 is conducting. In order to properly transition via this path, the current in the diode D2 has to be fully displaced by the auxiliary current, thus commutating the diode off.

The state transition from F_AUX2 to the RAMP_UP state depends on two inputs FA2 and !ILZ. FA2 is the acknowledgment of the presence of current of the correct polarity in the auxiliary circuit. The signal !ILZ ensures that the current in the diode D2 has been fully displaced. As in Paths #1 and #2, the state machine then sequences to the RAMP_UP state and to the A_MIDPOINT state to the P_RAIL state.

Complete State machine

Figure 6A:
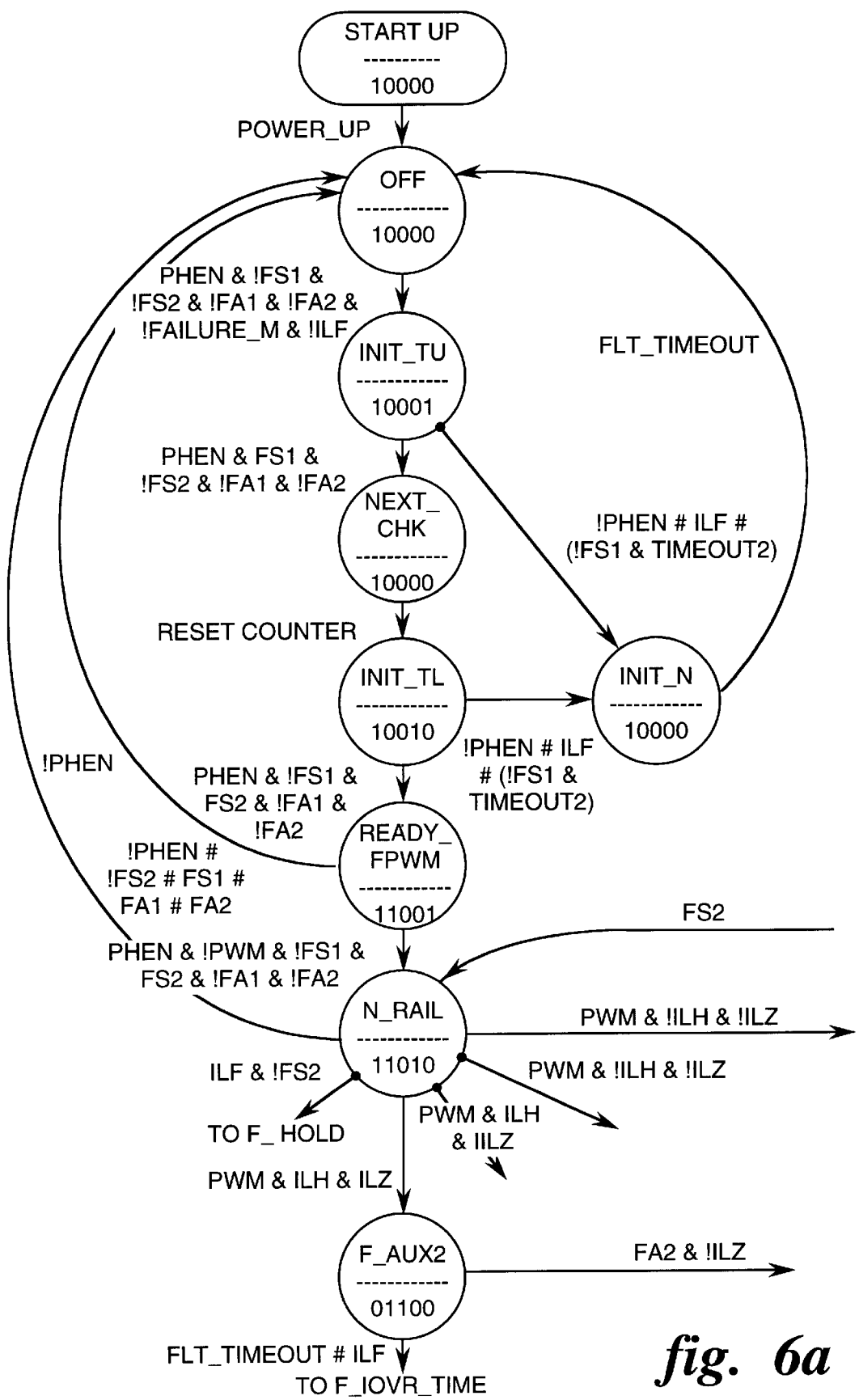
FIGS. 6a, 6b and 6c together comprise for the complete state sequencer of the phase controller of FIG. 4, including the start-up, fault-checking and fault-handling sequences.
Figure 6B:
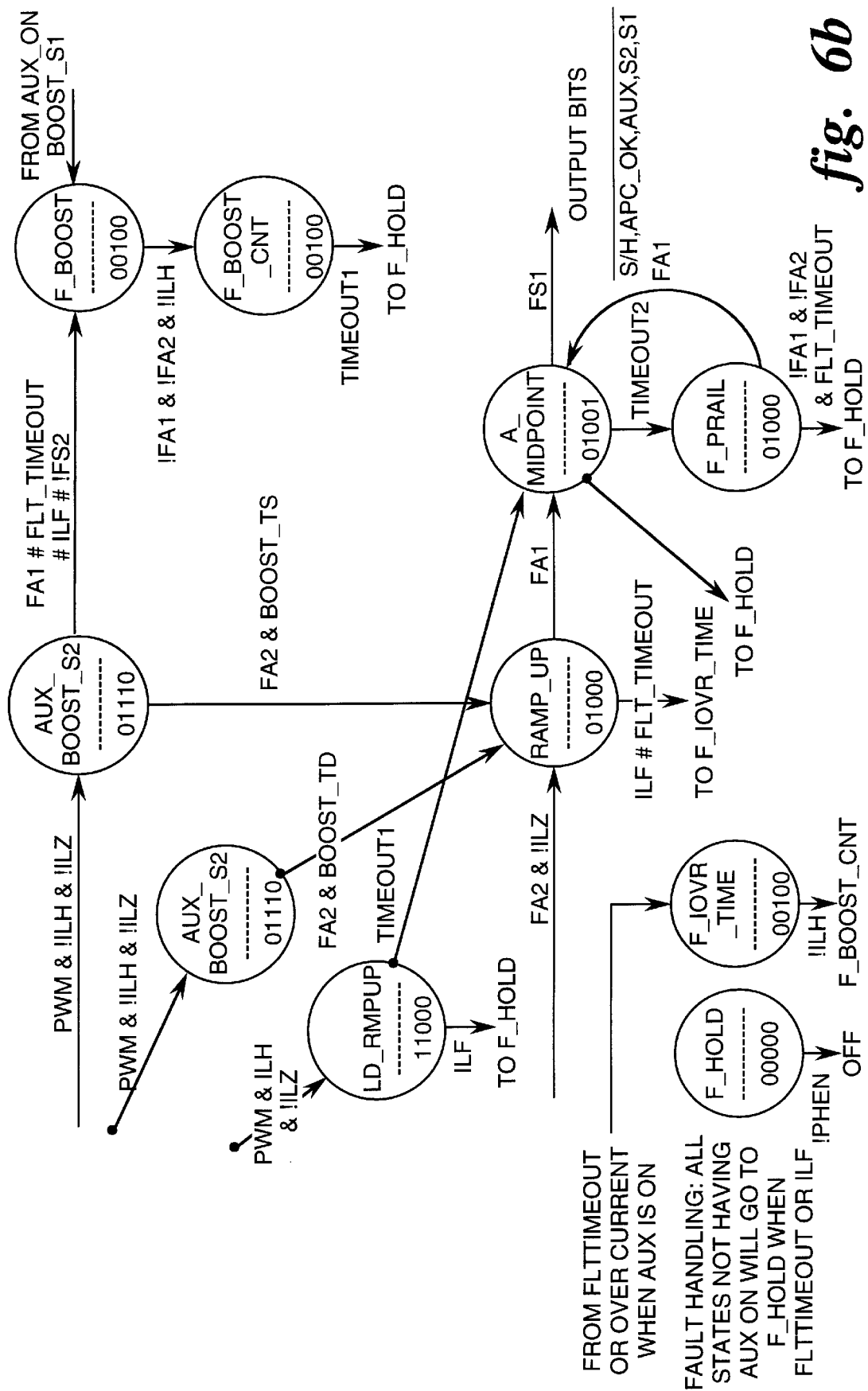
Figure 6C:
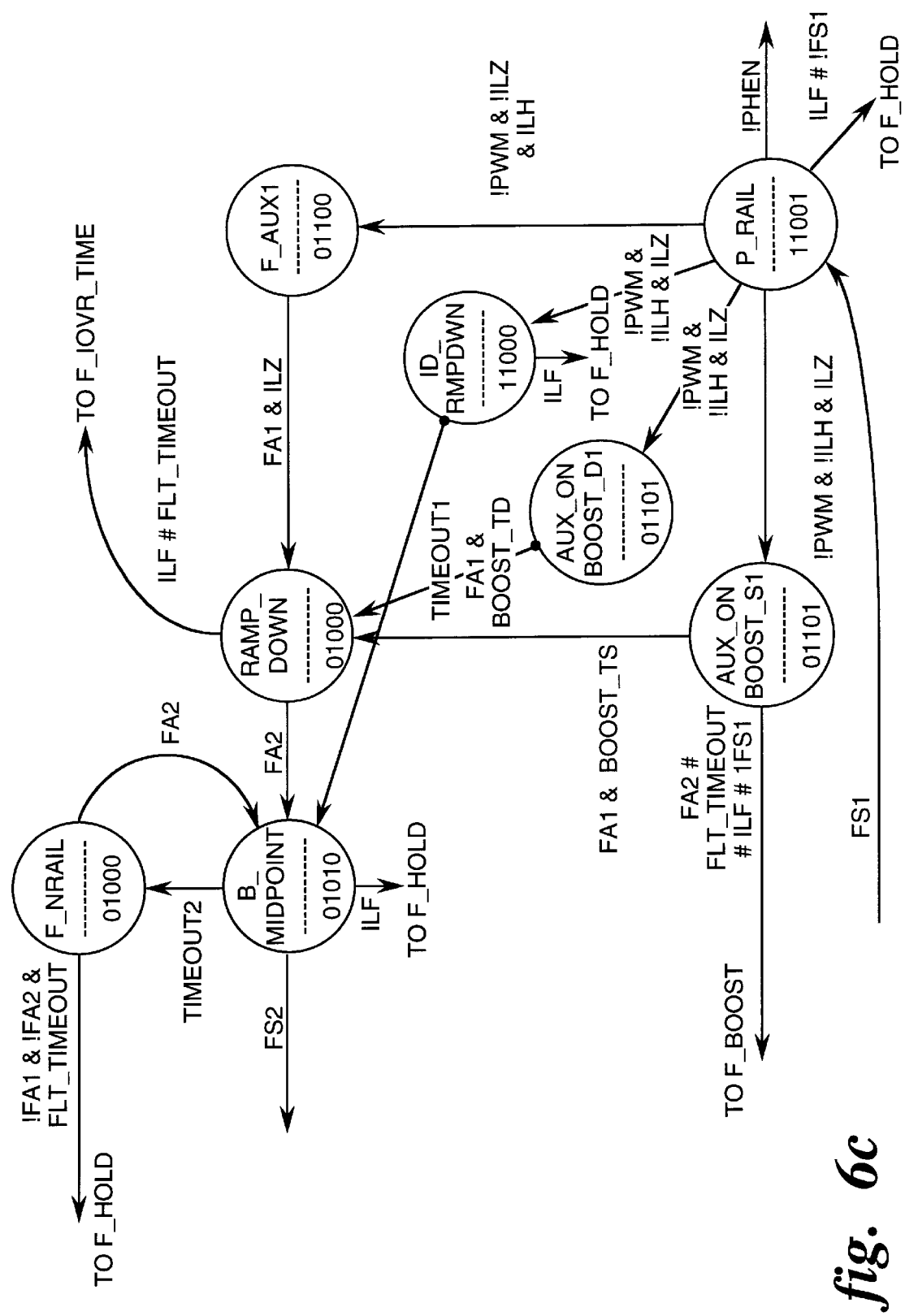

FIGS. 6a, 6b and 6c illustrate the complete ARCP state machine diagram including the start-up, fault-checking and fault-handling sequences.

At start-up, the state machine advances through the start up procedure while checking the conditions of all of the gate drives 14 and 16. It stops in the ready mode waiting for the correct PWM command. If an incorrect gate drive feedback is found, the state machine prevents the starting of the switching sequences. The APC_OK feedback to the system controller, i.e., the status feedback of the pole, is held inactive, thus disabling the converter.

The ARCP electronics are initialized by applying a low signal to the PWM input. Advantageously, the ARCP pole controller prevents hard switching events. Accordingly, the ARCP pole has to have one of the main devices turned on before the dc link voltage is raised so that a switching sequence can occur. For the particular embodiment illustrated and described herein, the lower device S2 must be on before power to the pole is applied.

Faults are checked in each of the operational states to determine whether there is an overcurrent or is an incorrect sequence, as detected by an improper feedback signal being active or by one of the watch dog timers. Depending on the type of fault detected, the state machine commands a shut down of the main devices, or it may try to keep the auxiliary devices on until it detects zero current in the auxiliary circuit since these devices can handle large peak currents. (However, if the auxiliary device is turned off during a high current condition in the auxiliary circuit, they can be damaged.)

The ARCP controller according to the present invention with its control electronics, has been developed and fabricated as a modular, scalable, power electronic building block. It may be used in a wide range of applications requiring high switching speeds, high efficiency, and high power density. It may be implemented in forms ranging in power from tens to hundreds of kilowatts. Examples of such applications would be dc/dc conversion, dc/ac and ac/dc conversion (single or multi-phase), and motor drives.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A control for a power converter having at least one inverter pole and an auxiliary resonant commutation pole (ARCP) circuit, each said pole comprising at least two main switching devices for coupling in series across positive and negative dc voltage rails, each of said main switching devices having an antiparallel diode thereacross, said ARCP circuit comprising a pair of auxiliary switching devices connected in series in opposite polarity to each other and further in series with a resonant circuit, said control comprising:

a state sequencer responsive to control and feedback signals for controlling said main switching devices and said auxiliary switching devices to operate to provide voltage transitions across said inverter pole between the positive and negative dc rail voltages in a substantially zero-voltage switching mode, said state sequencer controlling operation of said inverter pole along a plurality of state sequencing control paths, each of said paths comprising a plurality of sequential states, wherein operation along each said path is selected depending on whether a respective main switching device or its corresponding antiparallel diode is conducting, magnitude of the output current of said inverter pole, and polarity of the output current of said inverter pole.

2. The control of claim 1 wherein said switching devices are controlled by PWM.

3. The control of claim 1 wherein input signals to said state sequencer comprise a phase enable signal PHEN for enabling or disabling a respective phase leg and a PWM signal for commanding on and off said main switching devices.

4. The control of claim 1, further comprising a start-up sequence control for checking status of gate drive feedback signals, said start-up sequence control providing a pole status feedback signal for preventing start-up of said converter until said gate drive feedback signals are high.

5. The control of claim 1, further comprising a fault-checking/handling sequence for detecting overcurrents and incorrect state sequences and, in response thereto, for turning off said main switching devices or holding operation in a current state until current in said ARCP circuit decreases to substantially zero.

6. The control of claim 1 comprising closed-loop control having main gate drive feedback signals indicating on/off states of said main switching devices, auxiliary gate drive feedback signals indicating magnitude and polarity of auxiliary current in said ARCP, and the output current of said inverter pole.

7. The control of claim 4 wherein the magnitude and polarity of said auxiliary current are reconstructed from voltage sensed in a voltage-sensing coil in a resonant inductor in said resonant circuit.

8. The control of claim 1 wherein operation is controlled in said paths to provide transitions between said dc rails as follows:

(i) Under conditions of a main switching device conducting, said output current being below a boosting current threshold, and said output current being negative, operation is controlled in a first of said paths in an auxiliary boost state by turning on a respective auxiliary switching device for a predetermined time while said respective main switching device is conducting, then proceeding to a ramping state wherein current in said ARCP circuit reaches a peak resonant value, then proceeding to a midpoint state wherein said inverter pole achieves a midpoint in its transition between said dc rails, then proceeding to complete said transition upon reaching the opposite dc rail whereupon the opposite main switching device is turned on;

(ii) Under conditions of an antiparallel diode conducting, said output current being below said boosting current threshold, and said output current being positive, operation is controlled in a second of said paths in another auxiliary boost state by turning on a respective auxiliary switching device for a predetermined time while said respective main switching device is conducting, then proceeding to said ramping state wherein the current in said ARCP circuit reaches a peak resonant value, then proceeding to said midpoint state wherein said inverter pole achieves a midpoint in its transition between said dc rails, then proceeding to complete said transition upon reaching the opposite dc rail whereupon the opposite main switching device is turned on;

(iii) Under conditions of a main switching device conducting, said output current being above said boosting current threshold, and said output current being negative, operation is controlled in a third of said paths in another ramping state without using said ARCP circuit, then proceeding to said midpoint state wherein said inverter pole achieves a midpoint in its transition between said dc rails, then proceeding to complete said transition upon reaching the opposite dc rail whereupon the opposite main switching device is turned on; and (iv) Under conditions of an antiparallel diode conducting, said output current being above said boosting current threshold, and said output current being negative, operation is controlled in a fourth of said paths in another auxiliary state by turning on a respective auxiliary switching device until said output current is substantially fully displaced from said antiparallel diode while said respective main switching device is off, then proceeding to said ramping state wherein the current in said ARCP circuit reaches a peak resonant value, then proceeding to said midpoint state wherein said inverter pole achieves a midpoint in its transition between said dc rails, then proceeding to complete said transition upon reaching the opposite dc rail whereupon the opposite main switching device is turned on.

9. The control of claim 8 wherein the predetermined time in said second path is longer than the predetermined time delay in said first path in order to displace current in the conducting antiparallel diode and to aid said inverter pole to fully resonate to the opposite dc rail.

* * * * *